Figure 1:
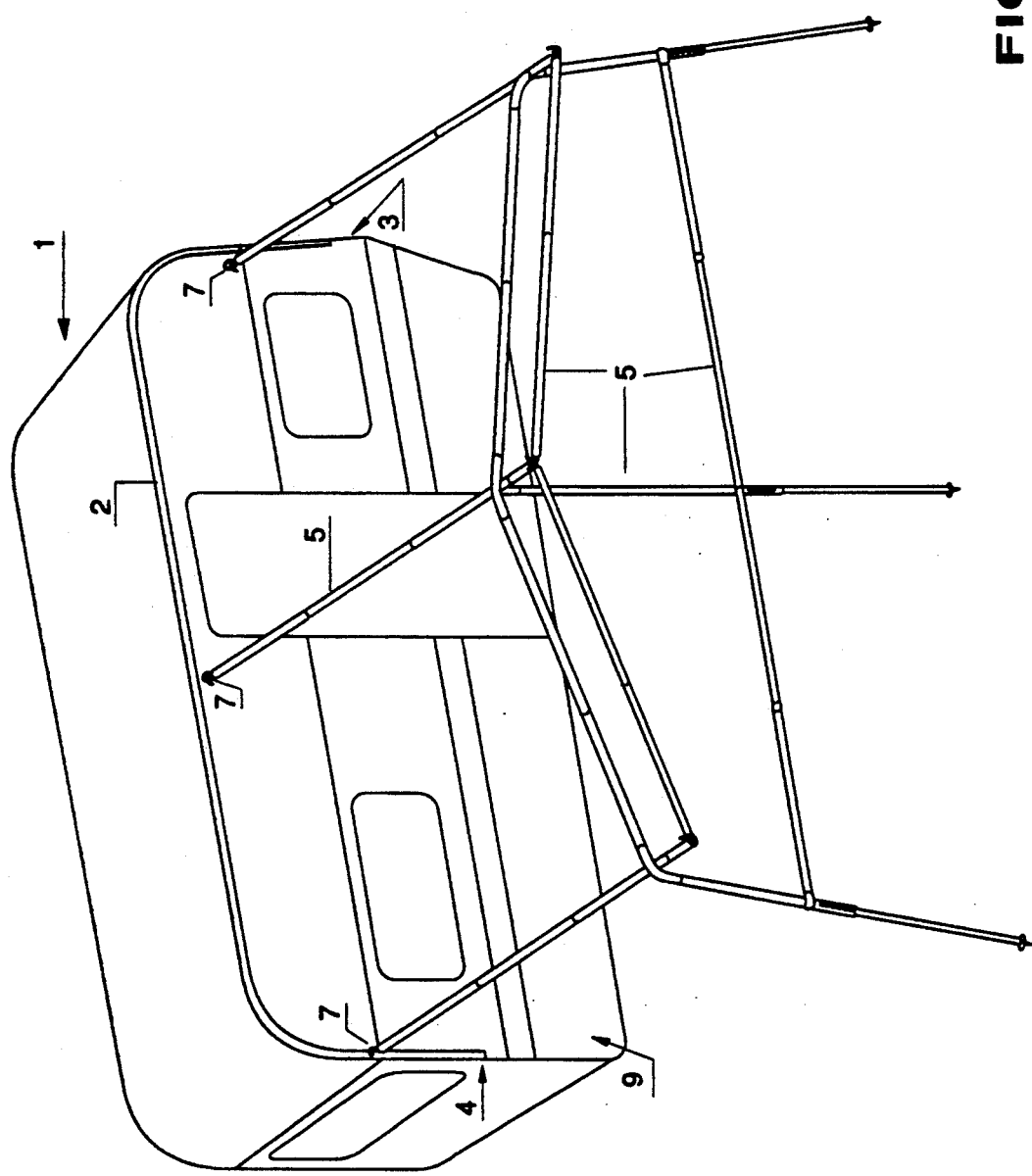

United States Patent [19]

Joergensen

[11] Patent Number: 5,190,066
[45] Date of Patent: Mar. 2, 1993

[54] DEVICE FOR ATTACHMENT ONTO A TENT, AND A TENT

[75] Inventor: Knud E. Joergensen, Odense, Denmark

[73] Assignee: Trio Sport A/S, Odense, Denmark

[21] Appl. No.: 573,974

[22] Filed: Aug. 28, 1990

[30] Foreign Application Priority Data

Aug. 31, 1989 [DK] Denmark .................. 4304/89

[51] Int. Cl.$^5$ .................................. E04H 15/08
[52] U.S. Cl. .......................... 135/89; 135/115; 160/66
[58] Field of Search ............ 135/89, 88, 115, 95; 160/66, 76

[56] References Cited

U.S. PATENT DOCUMENTS

| | | | |
|---|---|---|---|
| 2,808,065 | 10/1957 | Ellis | 135/89 X |
| 3,612,145 | 10/1971 | Darula | 135/89 X |
| 3,720,438 | 3/1973 | Johnson et al. | 135/89 X |
| 4,634,172 | 1/1987 | Duda | 160/66 X |

FOREIGN PATENT DOCUMENTS

| | | | |
|---|---|---|---|
| 2309270 | 8/1974 | Fed. Rep. of Germany | 135/89 |
| 2551917 | 6/1977 | Fed. Rep. of Germany | 135/89 |
| 3736537 | 5/1988 | Fed. Rep. of Germany | . |
| 080726 | 4/1963 | France | 135/89 |
| 1363930 | 5/1964 | France | . |
| 2246416 | 5/1975 | France | 135/89 |
| 2516767 | 5/1983 | France | . |
| 926369 | 5/1963 | United Kingdom | . |

Primary Examiner—Richard E. Chilcot, Jr.
Assistant Examiner—Lan Mai
Attorney, Agent, or Firm—Thomas R. Vigil; James P. Hanrath

[57] ABSTRACT

In order to provide an awning or a tent adapted for easy, removable attachment onto a caravan (1) in a sealed fashion, it is known in the art to form the canvas of the awning with a beading along one edge thereof formed with a casing (19) enclosing a beading core (12) and by providing the caravan with a fixed, stationary, hollow profile (2) with a narrow, longitudinal slit so that the beading may be introduced from the end of the hollow profile (2).

In order to avoid the requirement of the attachment onto the caravan of fittings with anchoring eyelets for the tent ridge poles, the invention provides a method for attaching an anchoring bracket onto the canvas of the awning adjacent the beading edge so that the hollow profile is, in fact, used to support the poles (5). According to the method of the invention the anchoring bracket is attached by stitching or attachment through the two layers of canvas interconnected to form the casing (19) within a narrow, essentially linear zone (18) extending essentially parallel to the casing.

The invention also provides the anchoring bracket and an awning with anchoring brackets.

11 Claims, 5 Drawing Sheets

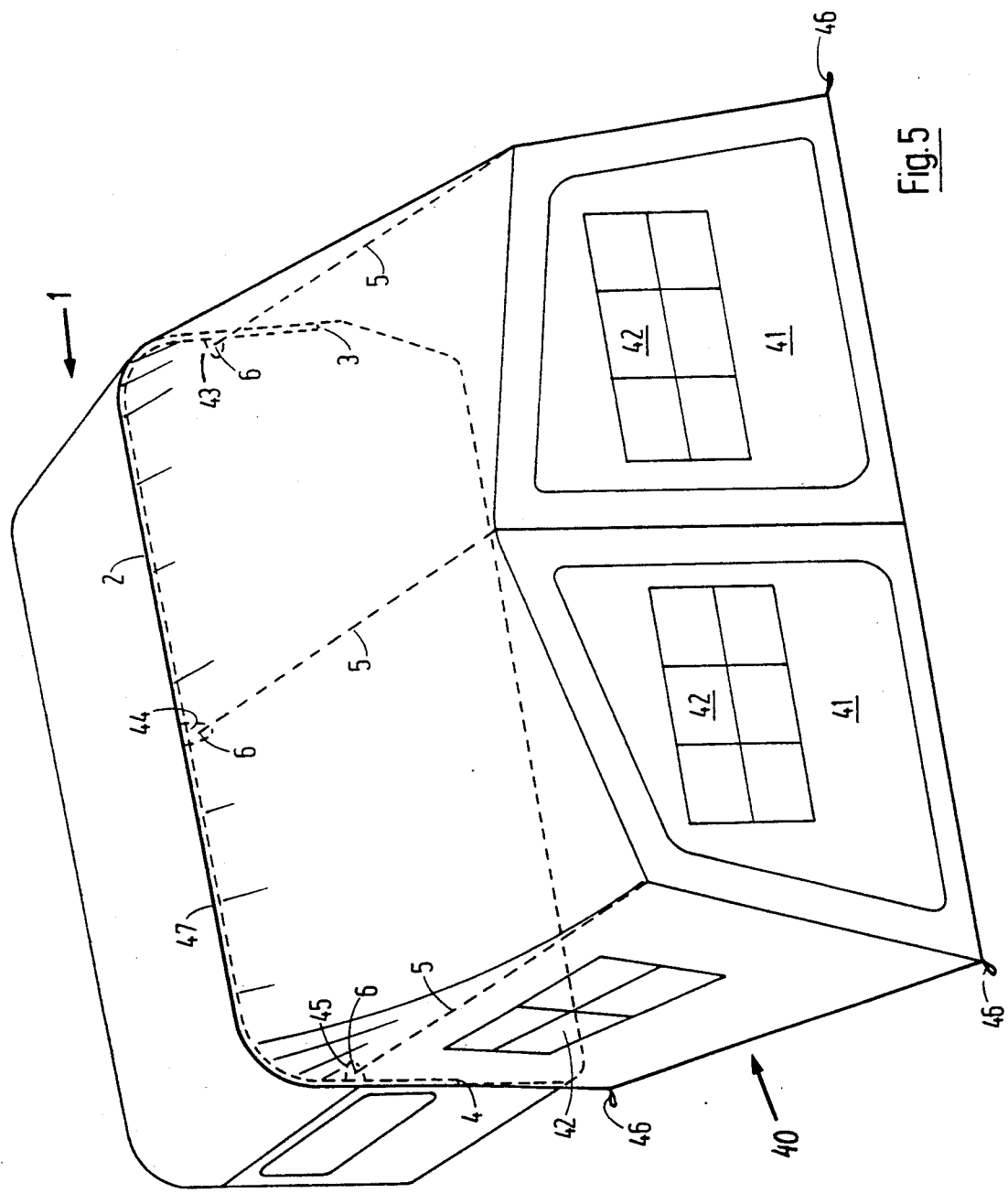

DEVICE FOR ATTACHMENT ONTO A TENT, AND A TENT

The present invention concerns a method for the attachment of an anchoring bracket onto the canvas of a tent or an awning as stated in the opening clause of claim 1.

The invention further concerns an anchoring bracket as defined in the opening clause of claim 2 and an awning with a beading along one edge intended for removable mounting onto a caravan.

Anchoring brackets of this general kind are used in connection with awnings for caravans, i.e. tents which may be arranged to form a compartment, wherein a longitudinal side of the caravan forms one wall, and wherein the tent is anchored to and supported onto the caravan. This kind of tent is quite popular and convenient in use, since it is possible to utilize the caravan for support and anchoring of the tent canvas and of the ridge poles, making it easy to design a tent, which is easily pitched and easily stroken, is spaceous and may serve as an awning or front porch at the caravan.

In order to provide a firm mounting of the canvas of the tent in a fashion sealed onto the caravan, it is a general procedure to design the canvas of the tent with a beading along one edge and to provide the caravan with a fixed, hollow profile with a narrow slit-like opening in order that the beading may be received in and retained in the hollow profile. The beading along the edge of the tent is conveniently manufactured by folding back a strip-like region of fabric along the edge of the tent and sewing or adhering the folded portion flat down onto the unfolded fabric portion to form a casing, which may enclose a beading core, e.g. a flexible rod, which may conveniently be permanently enclosed in or confined in the casing. In order to pitch the tent, the beading along one edge is inserted into the hollow profile from one end hereof and pulled along the hollow profile in the longitudinal direction into the desired position.

In order to anchor the tent ridge poles to the side of the caravan, it is general practice of the art to screw a number of anchoring brackets with eyelets into the side wall of the caravan just below the hollow profile. The ridge poles are normally terminated with hooks, which may be inserted into these eyelets. This mounting procedure, however, suffers a number of drawbacks. On one hand, caravans on the market are available in a great variety of sizes and shapes. On the other hand, awnings are also available on the market in a great variety of different sizes and shapes. The awnings are generally fully fashioned so that the ridge poles must be placed at predetermined positions relative to the canvas in the awning in order for the awning to take its intended shape. The great variety of sizes and shapes, however, makes it impossible to select standardized positions for the anchoring points. In order to allow a consumer the greatest possible choice in combining a caravan and an awning it is therefor not feasible to construct and market the caravan with fixed anchoring points. Instead anchoring eyelets are supplied as loose accessories so that each consumer, having made his choice of combination caravan and awning, must screw anchoring eyelets onto the caravan. This represents, on one hand, a craftsman-like procedure, which a consumer might rather not have to perform, and which he may be incapable of carrying out to a satisfactory result. Secondly it represents an intrusive operation in the outside wall of the caravan, which may be disfiguring and highly undesirable, e.g. in case the caravan should later be used in combination with a different awning.

It has been suggested that the anchoring eyelets be attached to the canvas of the tent adjacent the edge with the beading in order to utilize the hollow profile for anchoring the ridge poles, eliminating all other fittings or brackets on the side of the caravan. One solution of the prior art comprises a rubber pad with an anchoring eyelet and a flexible region intended to be glued onto the tent canvas. The pad is flat and generally rectangular, except for a rounding of the corners around the anchoring eyelet. In spite of the interesting prospects, this solution has not been successful on the market. This is believed to be attributable to a number of drawbacks inherent in the design. The rubber pad is flat and has to be glued along one edge to the tent canvas adjacent the beading. In the erected or in the pitched state with the canvas in the tent stretched in a direction close to horisontal away from the approximately vertical side of the caravan, the pad is likely to be bent close to a right angle (90°) and it must therefor be constructed of a relatively soft type of rubber so that it will not be torn off in the glued attachment. By making the pad soft, it is, however, not capable of providing a perfectly rigid support for the ridge pole. Insufficient support involves the danger of hitting the sides of the caravan with the ridge pole hooks with the danger of damaging the caravan surface.

In addition the method involving the attachment of the rubber pad by gluing it to the tent canvas surface is difficult to carry out to produce a well defined result, involving e.g. the danger that the glue adheres undesired parts, e.g. adhering a larger portion of the pad than desired, or glue seeping through the canvas of the tent adhering other regions of the tent canvas together than those intended. In addition the tent canvas may be stretched by forces applied onto the pad so as to be deformed around the region of attachment, and e.g. the ribbon forming the casing may, in case the rubber pad is glued to one side of this ribbon, be pulled so as to travel around the beading core to be deformed. The rectangular contour of the pad interacting with the tent canvas, which inevitably is compliant to some extent, will in addition concentrate the forces along the edges of the rubber pad, involving the danger of stress cracking of the gluing or tearing of the tent canvas initiating from the regions adjacent the rubber pad edges.

Deformations in the tent canvas are more than a simple cosmetic disadvantage as they are likely to interfere with the insertion of the beading edge along the hollow profile. In case of hollow profiles of lengths of several meters as it is generally the case, the insertion may be a difficult procedure anyway, and this procedure may be even more difficult or totally impossible if the fabric forms folds or wrinkles, is deformed, contains glue residue, or in case the rubber scrapes along the outer surfaces of the hollow profile, causing added friction. It is of utmost importance that this insertion is not impaired in any way. Finally the insertion process, during which the rubber pad is likely to scrape along the caravan sides, may involve the danger of tearing off the pad and there may be a risk that rubber material tends to come off onto the caravan side, in particular for such types of rubber that are well suited for gluing.

These disadvantages are overcome by the method according to the invention as defined in claim 1. This provides a rigid attachment of an anchoring bracket, since the transfer of forces from the bracket onto the tent canvas becomes the best possible, affecting the canvas in the gentlest possible way, since forces applied to the anchoring bracket will have no tendency to pull the casing ribbon to make it travel around the beading core.

The invention further provides an anchoring bracket designed to be in a region near the zone of attachment to the canvas and extending herefrom partially towards the attachment eyelet more compliant along the side edges than in the mid region in order that forces applied onto the anchoring eyelet will be transferred to the zone of attachment with a reduced tendency to concentrate the forces at the ends of the zone, i.e. at the edges of the anchoring bracket. This reduces the risk of tearing of the canvas.

According to another preferred embodiment the anchoring bracket is provided in its region below the anchoring eyelet with a soft, compliant coating intended to serve as a sole, said sole preferably comprising material with a higher coefficient of friction than the remaining part of the anchoring bracket. This provides an excellent support of the ridge poles with no adverse effect onto the caravan side walls, maintaining the brackets stationary by friction, in particular in case the caravan side wall is slightly roughened, while the remaining part of the anchoring bracket may be constructed of a relatively rigid and smooth plastic with the advantage of causing less frictional resistance against the hollow profile during the insertion of the beading.

According to a further preferred embodiment the anchoring bracket is formed of a flat piece of flexible material contoured with a wide base line adjacent the zone of attachment and with sides converging or tapering in the direction towards the anchoring eyelet. This provides a desirable transfer of forces applied onto the eyelet to the zone of attachment and makes the bracket tend to slip aside in case it meets obstacles adjacent the hollow profile during the insertion process.

According to a further preferred embodiment the anchoring eyelet comprises a total of four eyelets oriented along two axes parallel to the plane of the sole surface and mutually perpendicular. Hereby the ridge pole hooks may be inserted in directions so as to obtain the best possible support for all directions or attitudes of the hollow profile at the region adjacent the anchoring bracket, which is advantageous as the hollow profile may extend vertically, horisontally or in oblique angles.

According to a further preferred embodiment the sole is attached to the remaining part of the anchoring bracket by a stud or pivot inserted into a socket in order to make it pivotable with a pivot axis perpendicular to the sole surface. This provides an added flexibility, allowing a small extent of motion of the tent canvas in directions along the hollow profile, even while the tent is pitched and the ridge poles rigidly supported by friction against the caravan side wall.

Figure 2:
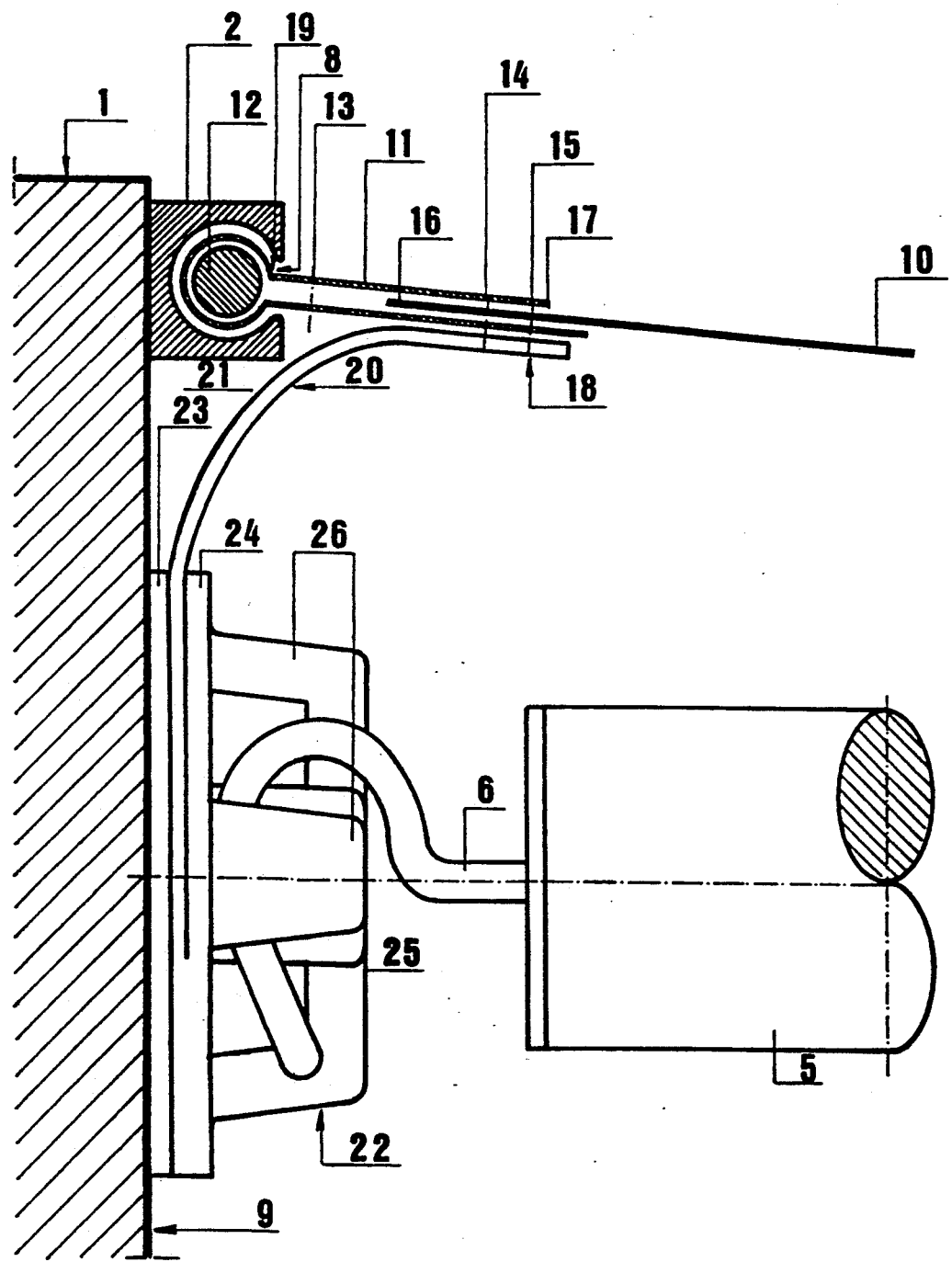
Figure 3:
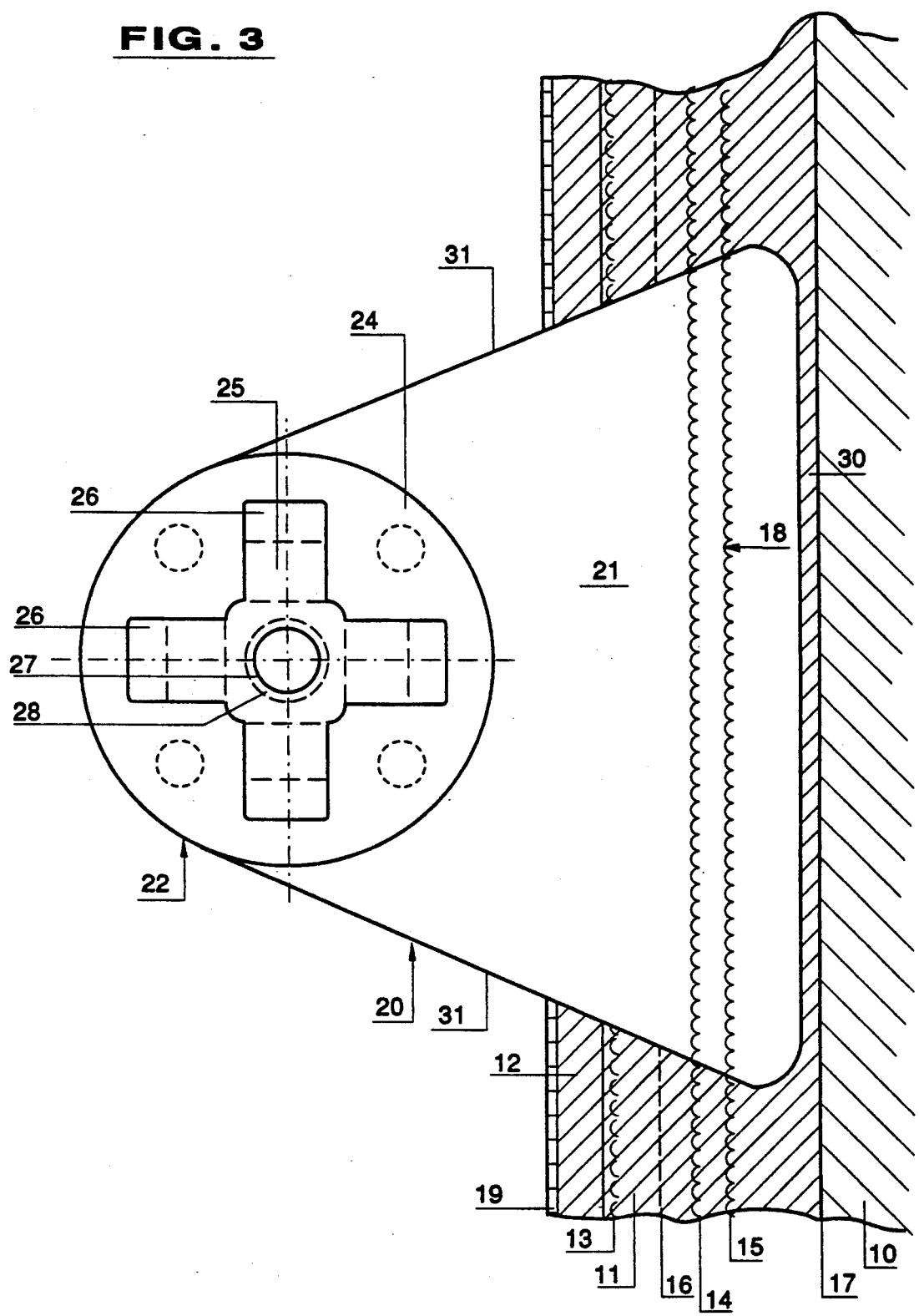
Figure 4:
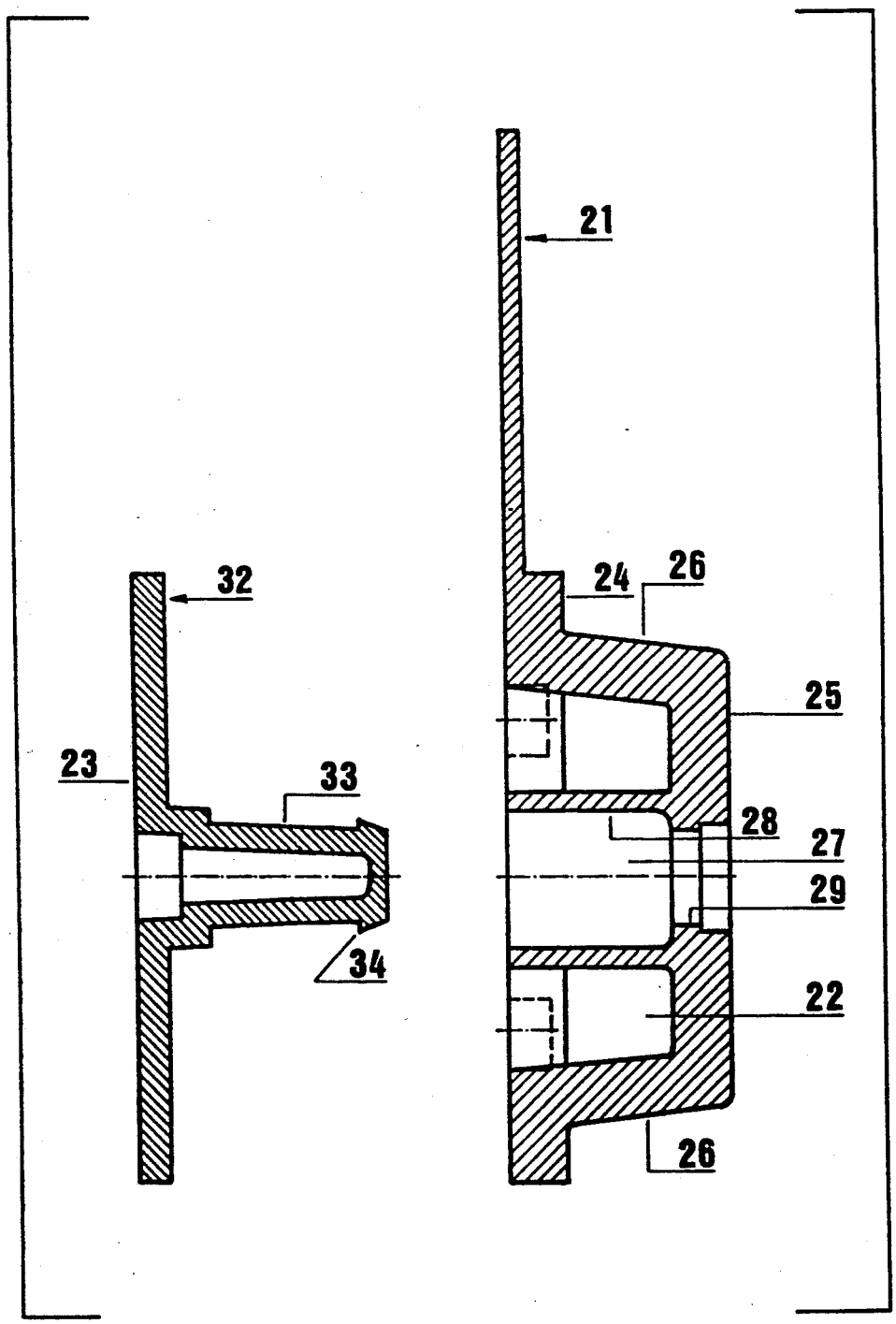

Further objects, features and advantages will appear from the following detailed description of non-limitating, illustrating examples with reference to the drawings, wherein FIG. 1 shows a perspective view of a caravan with the poles for the awning erected, FIG. 2 shows a section along a plane perpendicular to the hollow profile showing the position of an anchoring bracket according to the invention, FIG. 3 is a planar view from below showing a part of the tent canvas adjacent the beading edge with the attached anchoring bracket, FIG. 4 shows a section through an anchoring bracket with the sole in an exploded view, and FIG. 5 shows a perspective view of a caravan with an awning attached thereto and pitched.

In order to explain the use of the invention, reference is first made to FIG. 1, showing the arrangement of a caravan and the poles as they would be positioned in the erected or pitched awning, the canvas and the guy ropes of the tent being omitted from the figure in order to illustrate clearly the arrangement of the underlying parts. The figure shows a caravan 1 being provided along a portion of the edge of one side wall towards the roof and towards part of the front wall as well as part of the rear wall, respectively, with a hollow profile 2 extending from the profile front end 3 until the profile rear end 4. Outside the caravan a framework of tent poles 5 is erected with anchorings to the caravan at three points 7 in a way to be explained in more detail below.

Referring now to FIG. 2, it will be further explained, how the canvas of the awning and the ridge poles are attached to the caravan. To the left hand side of FIG. 2 the portion of the caravan 1 with the hollow profile 2 is shown. The awning canvas 10 is along the edge intended to be attached to a caravan provided with a beading. As it may be seen in FIG. 2, the beading is formed by folding a ribbonlike length of fabric 11 along a longitudinal folding line, stitching it together at the stitching 13 so as to form a casing and stitching it to the edge of the tent canvas 10 with two stitchings 14 and 15 so as to embrace the tent canvas edge. A beading core 12, e.g. a flexible plastic rod, has been inserted into the casing. As it may be seen in FIG. 2, the slit 8 in the hollow profile 2 is so narrow that the folded edge ribbon 11 with the caravan side wall adjacent the top edge, but it could alternatively and equally well be mounted on the caravan roof adjacent the side wall. The invention is obviously equally well applicable in either case. As it may be understood, referring also to FIG. 1, the awning canvas is attached by introducing an end of the beading through the open profile front end 3 or alternatively the open profile rear end 4 and pulling it with the canvas 10 along the entire length of the profile, whereafter the canvas is attached thereto in a rigid and sealed manner.

FIG. 2 further shows a section through an anchoring bracket 20 attached by the border stitching 15 to the tent canvas and to both sides of the folded edge ribbon 11. The anchoring bracket 20 comprises a flexible, flat piece 21 formed so that an upper portion hereof may lie flatly onto the tent canvas 10 while the opposite portion lies parallel to the caravan side wall. The anchoring bracket 20 is formed with a protrusion 23 adapted for contacting the caravan outside and serving as an contact sole. The anchoring bracket is provided on the side opposite the sole 23 with a thickened region 24 and with an anchoring eyelet formed essentially of a plateau 25 parallel to the sole contact surface and with a number of side ribs 26 as it will be explained in more detail below. A tent pole or ridge pole 5 is attached by inserting a hook 6 mounted permanently in the pole end through the anchoring eyelet. With the awning erected and stretched as in the normal state ready for use, the pole 5 illustrated in FIG. 2 will be forced against the caravan side wall, the friction between the sole 23 and the caravan side wall being generally sufficient to retain the anchoring bracket 20 in a stationary position. It may be understood from this figure that the flat piece 21 must have a sufficient length so as not to be stressed by the force from the pole. Otherwise this force could cause an unnecessary stress onto the tent canvas, reducing also the friction forces. It is generally sufficient if the bracket according to the invention has a length so that the sole of the anchoring bracket in the flat state extends beyond the tent canvas beading. An additional requirement is that the length must be sufficient to allow bending of the anchoring bracket as shown in FIG. 2 without causing significant forces onto the tent canvas.

Reference is now made to FIG. 3, where a portion of the tent canvas adjacent the beading edge with the anchoring bracket 20 attached by a stitching is shown from below, the anchoring bracket 20 being shown in its unfolded, flat state. FIG. 3 shows the stitching 13 closing the casing with the beading core 12 (shown in phantom), the edge of the tent canvas 16 (in phantom), a middle stitching 14 holding together the edge ribbon and the tent canvas and a stitching 15 to the right holding together both sides of the edge ribbon, the tent canvas and the anchoring bracket 20. The region of the anchoring bracket where it is attached to the tent canvas—in this embodiment a portion of the stitching 15— will be referred to as the zone of attachment 18. To the far right the edge 17 of the edge ribbon is shown. The casing could alternatively have been made by folding back a marginal region of the tent canvas and sewing these two portions together, but according to the most preferred embodiment the casing is made as shown in FIG. 3 from a separate length of material so that a piece of material, which is particularly strong and smooth, may be selected in order that the edge is sturdy and may easily be slipped into the hollow profile. The casing material may comprise a woven, plastic-coated length of fabric or a non-woven, granulated length of plastic with a low friction outer surface.

Although FIG. 3 shows an attachment of the anchoring bracket by the stitching 15, other ways of attachment could obviously be conceived within the frames of the invention. The particular layout of seams in the edge stitchings can be selected by those skilled in the art in various ways and the anchoring bracket may be adhered in any of the edge stitching seams or in any combination hereof. Other possibilities could be an attachment of the anchoring bracket by separate stitching, by welding or by riveting. In case such dedicated stitchings or a riveting procedure is used, the points of attachment should preferably be located between edge stitching seams. The zone of attachment should in any case extend essentially linearly and essentially parallel to the casing in order to ensure that the transfer of forces to the tent canvas affects the tent canvas in as gentle a fashion as possible.

FIG. 3 further shows how the anchoring bracket 20 has an essentially trapezoid contour with a wide baseline edge 30 along the stitching and inclined side edges 31 converging or tapering in the direction towards the anchoring eyelet shown to the left in the figure. Hereby the anchoring bracket becomes somewhat more flexible along the side edges 31 relative to the mid region in order that forces applied to the anchoring eyelet will be distributed or graduated more smoothly along the stitching. It is noted that the tent canvas exhibits considerable flexibility and that this implies a risk of forces applied onto the anchoring eyelet being concentrated to regions along one side edge or both side edges 31 with the danger of tearing the stitchings or shearing of the tent canvas initiated in these regions. It is therefor important that the anchoring bracket is more flexible along the side edges relative to the central region. The inclined side edges have a further advantage as they will make the anchoring bracket tend to slip aside, should it meet stationary obstacles during the pulling of the beading along the hollow profile.

To the left hand side it is shown how the anchoring eyelet comprises an approximately cross-shaped plateau region 25 connected to the underlying, thickened region 24 by four side ribs 26 and a central bushing or sleeve 28 (shown in phantom). This provides effectively four anchoring eyelets at hand to obtain the advantage that the tent pole hook may always be inserted from above and in a direction downwards or at least downwardly inclined regardless of the inclination of the hollow profile 2. As, for the purposes of the invention, normally only one anchoring eyelet is used, three eyelets will be freely available for other purposes, which is an additional advantage.

Reference is now made to FIG. 4 showing in section the two components of the anchoring bracket shown in separated state and in section. To the left the first part is shown comprising a shoe 32 with the sole 23, which is flat with a circular contour. Centrally the sole 23 merges into an axial mounting stud 33 with an annular arrester rim 34 at the top. The figure shows how the arrester rim 34 is formed with an inclined upper surface and with a holding surface below in order that it may easily be introduced into a bushing to be latched and retained therein. This part may advantageously be manufactured by molding, e.g. of an extrudable rubber material.

To the right in FIG. 4 the second part of the anchoring bracket is shown, said part comprising an essentially flat piece 21 with a thickened region 24, a plateau region 25 parallel to the flat piece 21 with side ribs 26 (only two of the side ribs are visible in FIG. 4) and with a central bushing 28 with an opening 27 with an arrester lip. This component of the anchoring bracket may be manufactured my molding of plastic, e.g. polyurethane, and these parts are obviously matched so that, by introducing the mounting stud 33 into the bushing 28, the shoe may be attached to and latched into permanent engagement between the anchoring bracket arrester lip 29 and the mounting stud 33 arrester lip may be attached to and latched into permanent engagement between the anchoring bracket arrester lip 29 and the mounting stud 33 arrester lip 34. This provides a mount enabling the sole to pivot around the mounting stud 33 axis. This design has the advantage that the anchoring bracket flat piece can be made of relatively hard and smooth plastic capable of providing solid and rigid anchoring eyelets, while the sole may be manufactured of a softer plastic and possibly a plastic with a higher coefficient of friction capable of providing a good frictional engagement with the caravan side wall. The possibility of pivoting the shoe relative to the remaining part of the mounting bracket provides some flexibility in use as the anchoring bracket trapezoid part may pivot slightly around the axis of the bushing 28 without loosening or moving of the frictional engagement.

Reference is now made to FIG. 5, showing a caravan 1 with an awning 40 attached hereto and pitched in a form ready for use. The awning is supported on a system of poles erected as shown in FIG. 1. Obviously the pitched awning conceals the system of poles and the side of the caravan, FIG. 5 showing the outline of the caravan side in phantom as well as the ridge poles 5 in phantom.

The awning is provided along one edge 47 with a beading in the manner explained above, with particular reference to FIG. 2, the beading being inserted through the entire length of the hollow profile 2, extending along a portion of the caravan side as explained with reference to FIG. 1. Thus the awning is supported tightly and rigidly onto the caravan along the entire length of the hollow profile 2. The awning is fashioned to a set of poles 5 and provided at the lower corners with straps 46 so that it may be anchored into the ground in a manner well known in the art. The awning is further provided with transparent windows 42 and with doors 41 to be opened or closed by the use of zippers as it is well known in the art.

The above-mentioned features all belong to the state of art.

The awning according to the invention is further provided with anchoring brackets of the kind mentioned above, said anchoring brackets being attached to the awning near the edge 47 in the manner explained above with reference to FIG. 2. The awning shown in FIG. 5 is provided with three anchoring brackets, one anchoring bracket 43 intended for supporting a ridge pole at the caravan front end, one anchoring bracket 44 intended for supporting the ridge pole near the caravan mid portion, and one anchoring bracket 45 being intended for supporting a ridge pole near the caravan rear end (these brackets are shown in phantom in FIG. 5).

In order to erect the awning, it is first unfolded, whereafter the beading edge 47 is pulled along the hollow profile 2, until it has reached its intended position. The anchoring brackets 43, 44, 45 being attached to the awning, hereby reach the positions as shown in phantom in FIG. 5. The next stage is the insertion of the hooks in the ends of the ridge poles into the respective anchoring brackets and the interconnection of the various poles to form the girder structure shown in FIG. 1. With the awning overlying loosely the pole structure, the ridge poles by their connection to the anchoring brackets 43, 44, 45, respectively, are effectively supported in the caravan by means of the beading edge 47 held in the hollow profile 2. The next stage is the stretching out of the entire awning and the anchoring of the straps 46 into the ground to stretch out the awning into the position as shown in FIG. 5. The tension forces in the awning tend to press the ridge poles in the direction towards the caravan side wall, whereby the anchoring brackets 43, 44, 45 will be fixedly supported by the friction between the bracket sole surfaces 23 and the caravan side wall 9, as explained with reference to FIG. 2.

Striking of the awning is performed in the reversed order of operations as it will be obvious to those skilled in the art.

Although certain preferred embodiments of the present invention have been described with particularity, other embodiments, which posses the same features and advantages, will be apparent to those skilled in the art. Accordingly the scope of the present invention should be determined only by the appended claims.

I claim:

1. An awning adapted for removable attachment onto a caravan or a similar vehicle, said caravan comprising an outside wall surface and a hollow profile with a longitudinal slit, said hollow profile extending along at least a portion of said wall surface, said awning comprising: a canvas, an edge of said canvas, at least one anchoring bracket attached to said canvas adjacent said edge, and a beading extending along said edge and adapted for insertion into said hollow profile with said canvas extending through said longitudinal slit and away from said beading, in order to removably attach said awning to said caravan, whereby said canvas when stretched in a direction generally away from said beading retained in said hollow profile may be suspended so as to extend generally away from said wall surface and along said stretching direction, said beading being formed by folding back and stitching together a band of fabric to define two layers, said band of fabric attached to said edge of said awning canvas to form a casing, said casing containing an elongate body constituting a core of said beading, and wherein said anchoring bracket is mounted by attachment through both layers of said band forming said casing within a narrow, essentially linear zone, said zone extending for a predetermined length and essentially parallel to said beading, said anchoring bracket comprising: at least one anchoring eyelet, and a contact surface adapted for supporting a portion of said anchoring bracket adjacent said anchoring eyelet against said wall surface, said anchoring bracket being attached to said canvas in such a way that said contact surface may extend away from said stretching direction.

2. The awning according to claim 1, wherein said anchoring bracket comprises an essentially flat and elongate piece of flexible material so that a first portion of said bracket adjacent said zone of attachment may extend essentially parallel to said stretching direction, whereas a second portion of said bracket adjacent said anchoring eyelet may flex to extend approximately perpendicular to said stretching direction.

3. The awning according to claim 2, wherein said anchoring bracket comprises side edges extending generally from said zone of attachment and towards said anchoring eyelet, said anchoring bracket comprising a region adjacent said zone of attachment and extending therefrom at least partially in a direction towards said anchoring eyelet said anchoring bracket exhibiting greater flexibility in portions of said region close to each of said side edges as compared to the flexibility exhibited within central portions of said region, in order that any force applied to said anchoring eyelet will be transferred to said canvas when attached at said zone of attachment with a reduced tendency to concentrate said force at the ends of said zone of attachment.

4. The awning according to claim 3, wherein said anchoring bracket is formed of an essentially flat piece of flexible material, said piece of flexible material being contoured with a wide base line adjacent said zone of attachment and with side edges converging or tapering together in the direction towards said anchoring eyelet.

5. The awning according to claim 4, wherein said anchoring eyelet protrudes out of the plane of said piece of flexible material.

6. The awning according to claim 5, wherein said piece of flexible material is provided on the side opposite said anchoring eyelet with a soft, compliant coating adapted for serving as said contact surface.

7. The awning according to claim 6, wherein said coating comprises material with a higher coefficient of friction than said piece of flexible material.

8. The awning according to claim 1, wherein said anchoring eyelet comprises at least two eyelets with different orientations.

9. The awning according to claim 8, wherein said anchoring eyelet comprises four eyelets oriented along two axes parallel to the plane of said contact surface and mutually perpendicular.

10. The awning according to claim 1, wherein said anchoring bracket comprises a first and a second part, said first part being attached to said canvas, said second part comprising said contact surface, said first part comprising a socket, and said second part comprising a stud adapted for being received and retained in said socket in such way that said second part is pivotable relative to said first part.

11. The awning according to claim 10, wherein said second part is pivotable relative to said first part about a pivot axis extending generally perpendicularly to said contact surface.

* * * * *